E. J. BRASSEUR.
CALCULATING MACHINE.
APPLICATION FILED MAR. 27, 1911.
1,007,427.
Patented Oct. 31, 1911.
6 SHEETS—SHEET 1.
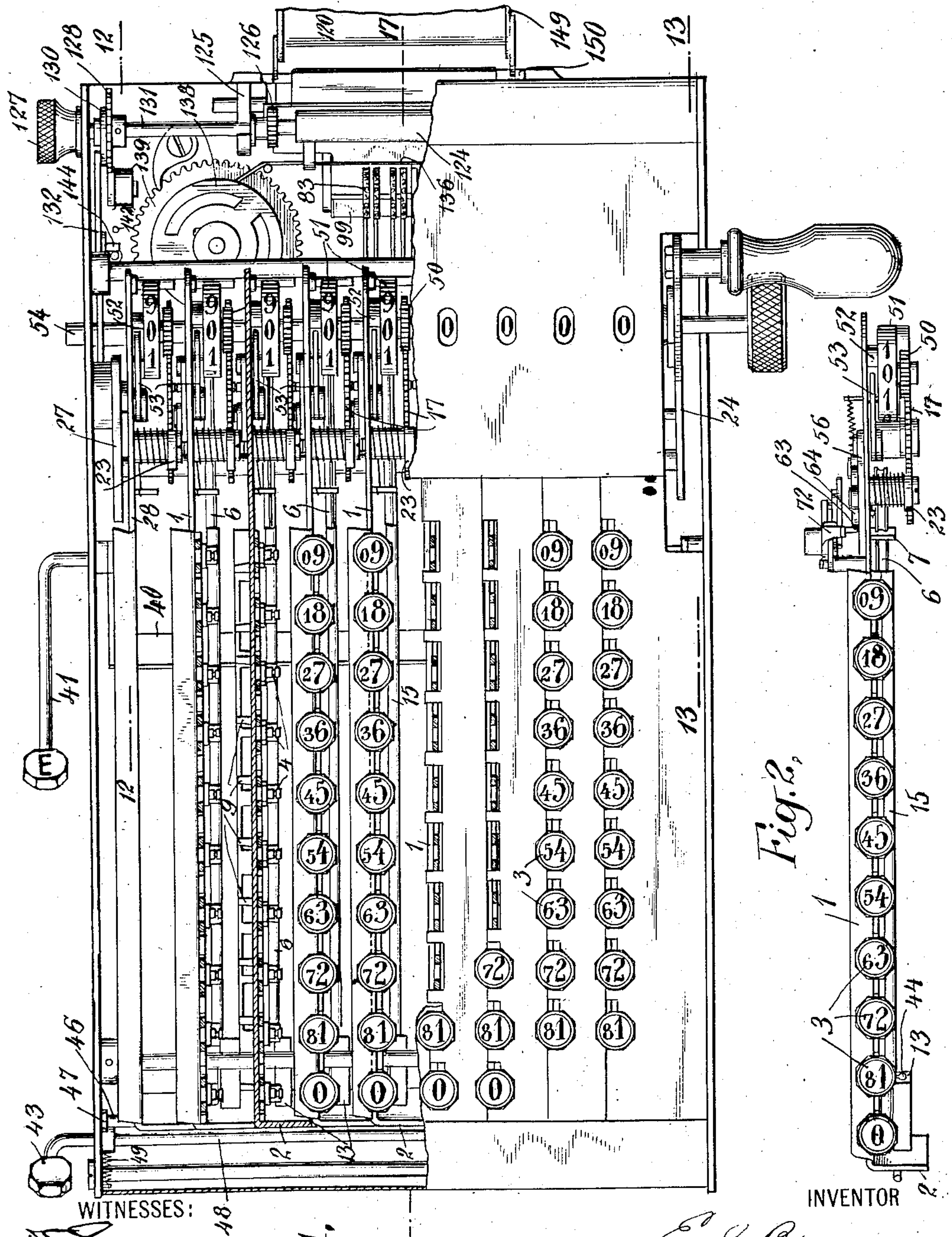
WITNESSES:
INVENTOR
E. J. Brasseur
BY
Edmonds & Edmonds
ATTORNEYS E. J. BRASSEUR.
CALCULATING MACHINE.
APPLICATION FILED MAR. 27, 1911.
1,007,427. Patented Oct. 31, 1911.
6 SHEETS—SHEET 2.
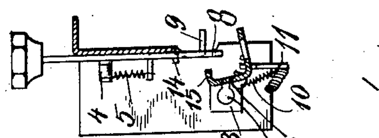
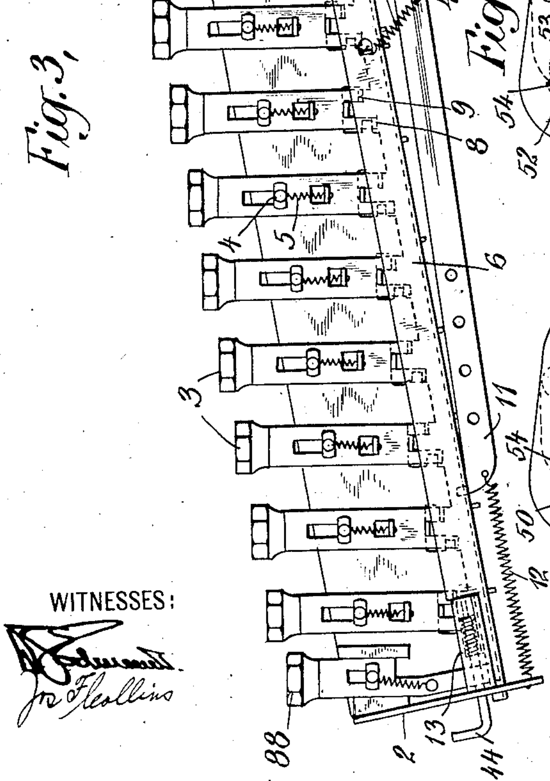
WITNESSES:
INVENTOR
E. J. Brasseur
BY
Edmonds & Edmonds
ATTORNEYS E. J. BRASSEUR.
CALCULATING MACHINE.
APPLICATION FILED MAR. 27, 1911.
1,007,427.
Patented Oct. 31, 1911.
6 SHEETS—SHEET 3.
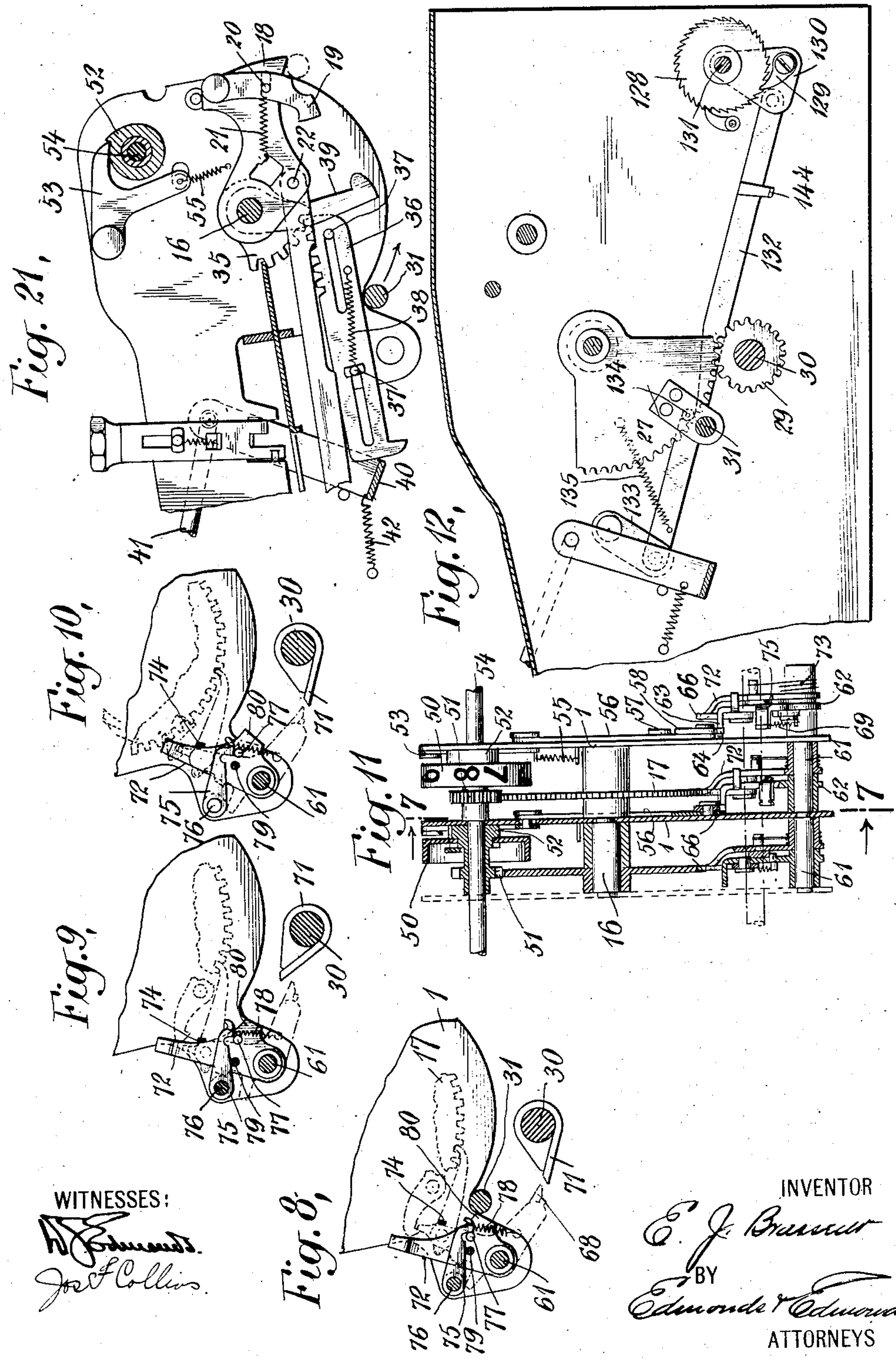
WITNESSES:
INVENTOR
E. J. Brasseur
BY
Edmonds & Edmonds
ATTORNEYS E. J. BRASSEUR.
CALCULATING MACHINE.
APPLICATION FILED MAR. 27, 1911.
1,007,427.
Patented Oct. 31, 1911.
6 SHEETS—SHEET 4.
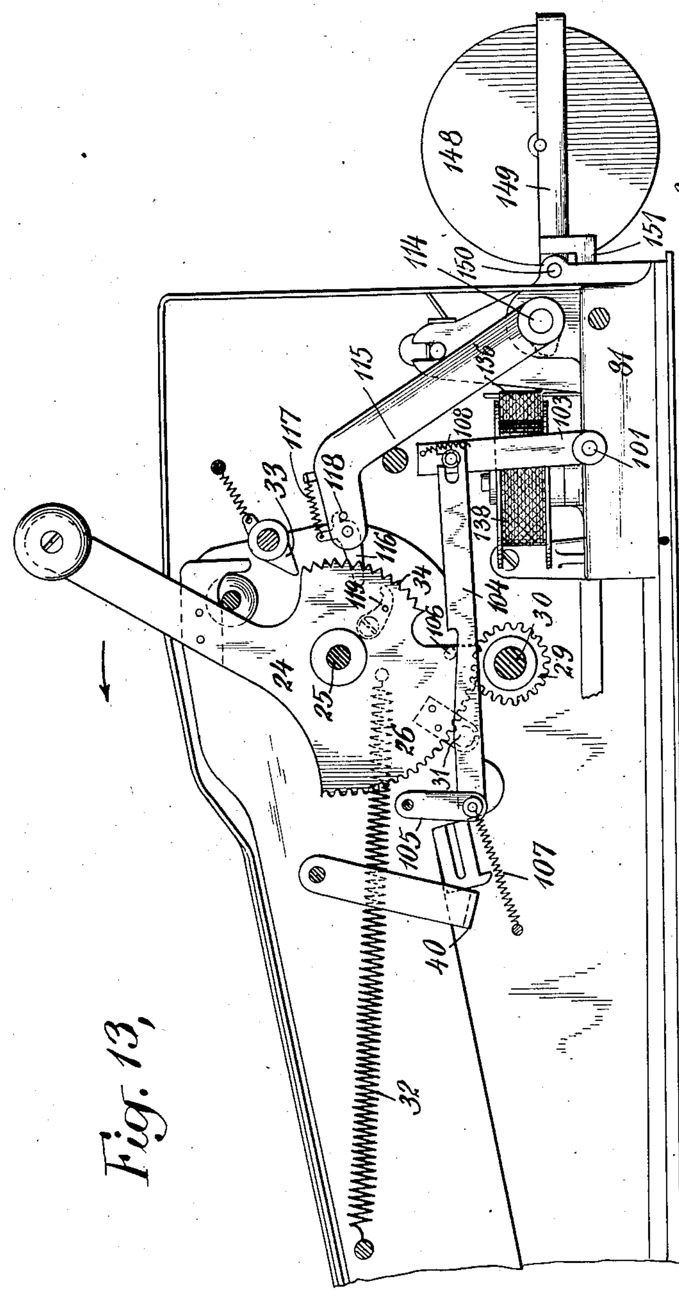
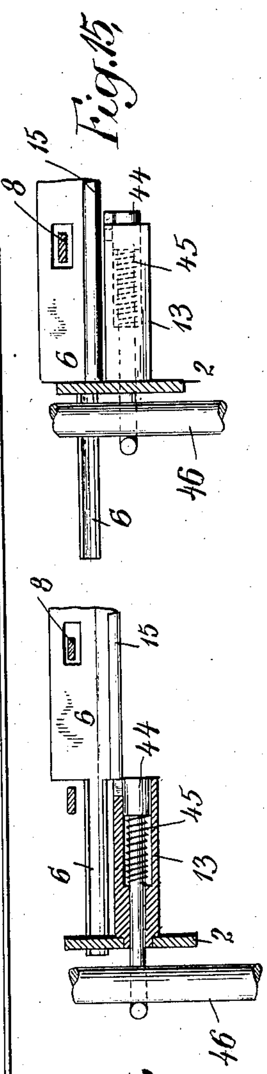
WITNESSES:
INVENTOR
E. J. Brasseur
BY
Edmonds & Edmonds
ATTORNEYS E. J. BRASSEUR.
CALCULATING MACHINE.
APPLICATION FILED MAR. 27, 1911.
1,007,427.
Patented Oct. 31, 1911.
6 SHEETS—SHEET 5.
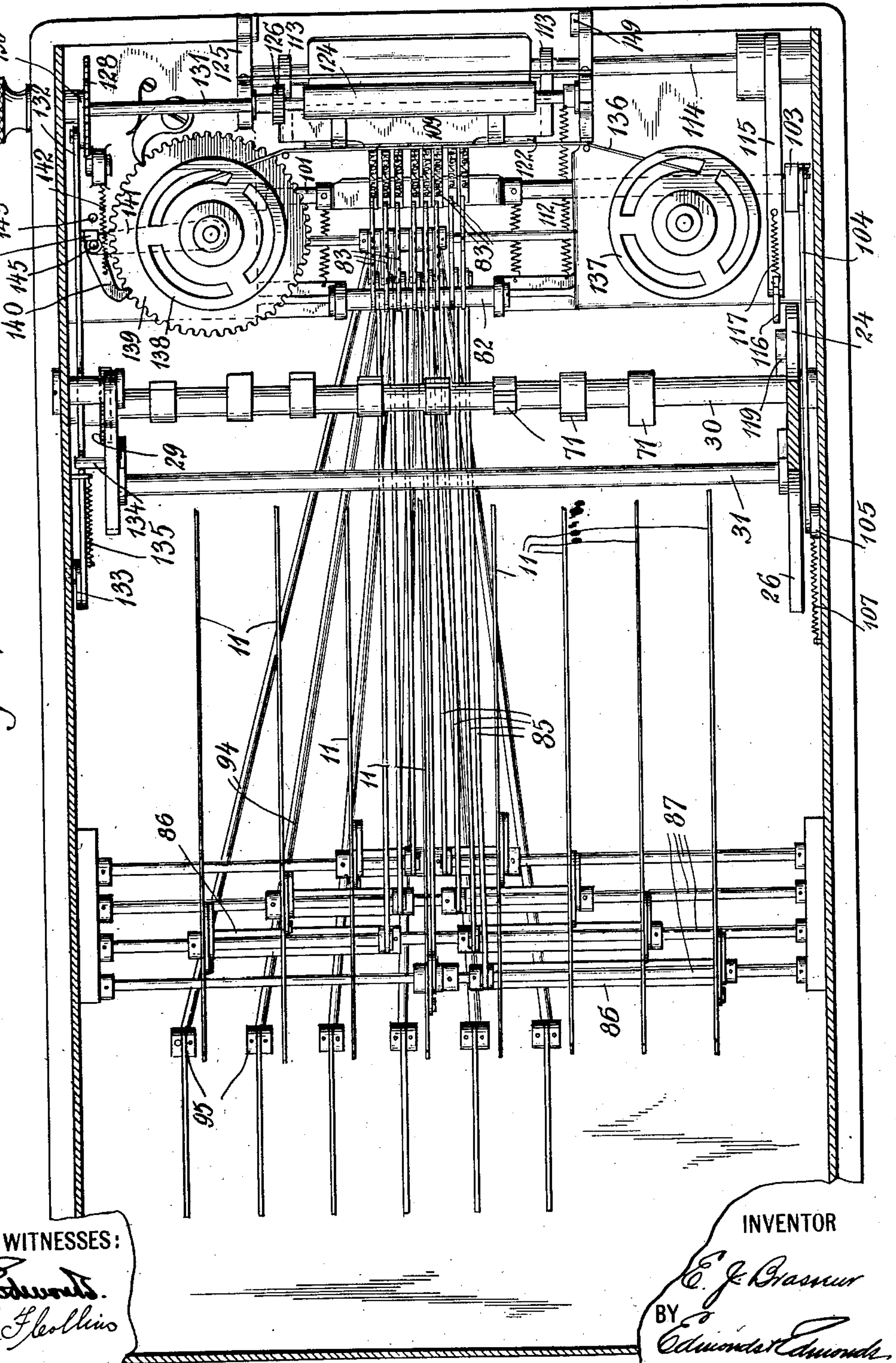
WITNESSES:
INVENTOR
E. J. Brasseur
BY
Edmonds & Edmonds
ATTORNEYS E. J. BRASSEUR.
CALCULATING MACHINE.
APPLICATION FILED MAR. 27, 1911.
1,007,427.
Patented Oct. 31, 1911.
6 SHEETS—SHEET 6.
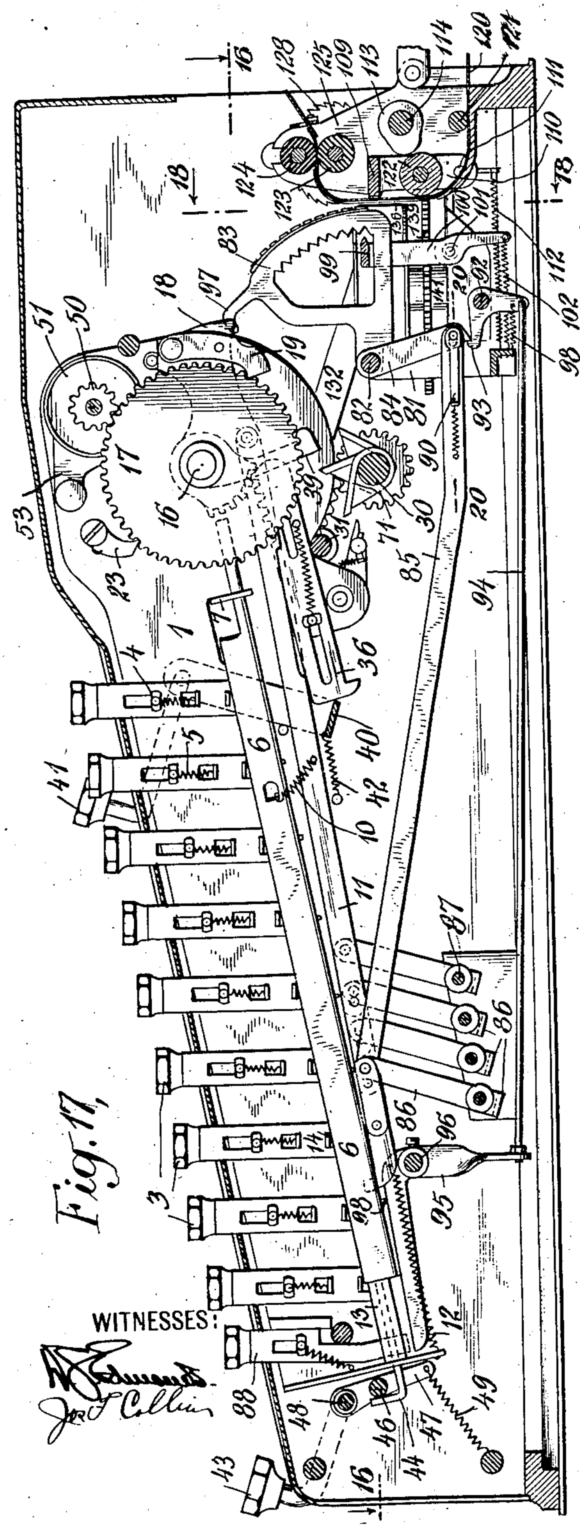
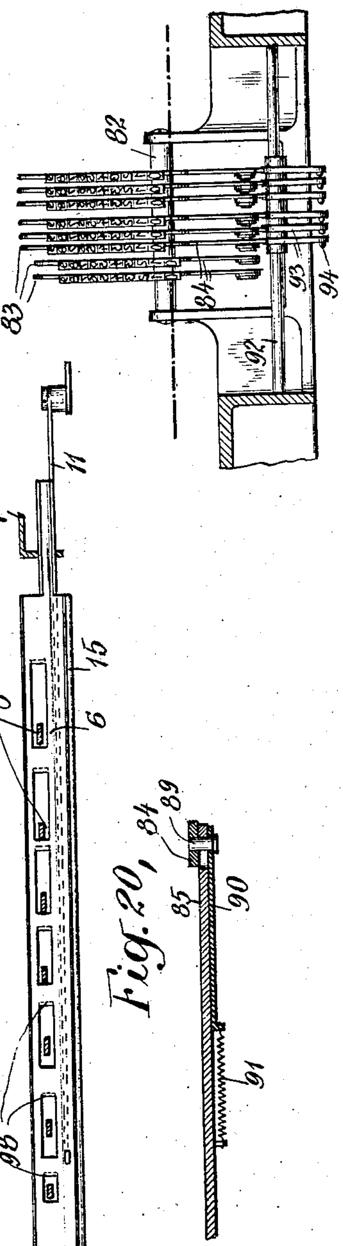
WITNESSES:
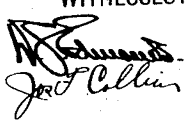
INVENTOR
E. J. Brasseur
BY
Edmonds & Edmonds
ATTORNEYS

UNITED STATES PATENT OFFICE.

ERNEST J. BRASSEUR, OF CHICAGO, ILLINOIS, ASSIGNOR TO A. B. DICK COMPANY, OF CHICAGO, ILLINOIS, A CORPORATION OF ILLINOIS.

CALCULATING-MACHINE.

1,007,427. Specification of Letters Patent. Patented Oct. 31, 1911.

Application filed March 27, 1911. Serial No. 617,010.

*To all whom it may concern:*

Be it known that I, ERNEST J. BRASSEUR, a subject of the King of Belgium, residing at Chicago, in the county of Cook and State of Illinois, have invented certain new and useful Improvements in Calculating-Machines, of which the following is a specification.

This invention relates to machines for performing arithmetical operations mechanically and for printing upon a suitable sheet the numbers employed in the operation and the results obtained. The machine is particularly adapted for adding and for listing upon a paper tape the numbers to be added and the sum thereof.

The invention is directed to the provision of a machine of this character which is reliable and efficient in operation and which can be manufactured at comparatively low cost.

To this end the invention comprises numerous novel features, among them the provision of an improved carrying mechanism and improved devices for setting the type for printing and for printing therefrom. These and other features of the invention will be fully set forth in the following description and pointed out definitely in the claims appended hereto.

The preferred embodiment of the invention is illustrated in the accompanying drawings in which—

Figure 1 is a top view of the machine broken away and sectioned in part, Fig. 2 is a top view of one of the denominational units, Fig. 3 is an elevation of one of the units, Fig. 4 is a transverse section of the unit on line 4—4 of Fig. 3, Figs. 5, 6, and 7 are detail views of the carrying mechanism, the section of Fig. 7 being indicated by the line 7—7 of Fig. 11, Figs. 8, 9 and 10 are additional detail views of a portion of the carrying mechanism, Fig. 11 is a transverse section on line 11—11 of Fig. 7, Fig. 12 is a longitudinal section of a portion of the machine on line 12—12 of Fig. 1, Fig. 13 is a similar view on line 13—13 of Fig. 1, Figs. 14 and 15 are detail views of a portion of the mechanism employed in multiplying, Fig. 16 is a plan view of the printing mechanism in horizontal section on line 16—16 of Fig. 17 with the sets of keys and their supports removed, Fig. 17 is a longitudinal section of the machine on line 17—17 of Fig. 1, Fig. 18 is a transverse section of a portion of the mechanism employed in the machine on line 18—18 of Fig. 17, Fig. 19 is a view of one of the sliding bars, Fig. 20 is a detail view in section on line 20—20 of Fig. 17, and Fig. 21 is a detail view hereinafter referred to.

The calculating machine shown in the drawings is of the character known as a "key-set" machine, wherein the depression of keys positions certain of the operating parts of the machine in accordance with the value of the keys depressed and thereafter an operating device may be moved manually or otherwise to cause the number-wheels of the machine to be actuated an amount depending upon the extent of movement of the parts positioned by the depression of the keys. A plurality of rows of keys are provided, as many rows as the number of numerical orders in which it is desired to operate, each row comprising nine keys numbered from 1 to 9, or ten keys, in which latter case a zero key would be included. One key in each row may be depressed for each operation and when that key is depressed it is locked in its depressed position and the other keys in the row are locked against depression. When a key in a row is depressed it permits a slide-bar corresponding to that row to move in the direction of its length a distance corresponding to the value of the key depressed, and as this slide-bar moves thus, it carries a pawl around upon a gear wheel with which that pawl coacts, the movement of the pawl being commensurate with the movement of the side-bar; upon actuation of the operating device all the pawls which have been moved thus are turned to their initial positions, moving their gear-wheels with them, and the gear-wheels cause corresponding rotation of the number-wheels which either indicate the result of the operation or are positioned for printing the result upon a suitable paper strip. In the present instance, both indicating wheels and printing mechanism are provided. In combination with these parts a carrying mechanism is employed whereby any one of the mechanisms can cause the mechanism of the next higher order to advance one unit, as will be well understood.

In the preferred embodiment of the machine each row of keys, the slide-bar connected therewith, the number-wheel actuated on the return of that slide-bar to its initial position and the carrying mechanism corresponding to that member-wheel are all mounted on a single support, so that all of these parts for one numerical order may be assembled upon the support and thereafter a suitable number of these units may be secured together in the machine. Fig. 1 shows a machine having eight of these units, the units being constructed as illustrated in Figs. 2, 3, 4, and 17. Each unit consists of a support 1 of sheet metal, having one end 2 bent to form a spacer for separating adjacent units the required distance. Each unit has a row of nine keys 3 mounted thereon for vertical reciprocating movement, these keys being numbered respectively from 1 to 9. Each key has a slot formed in its stem through which extends a stud 4 the head of which is flattened on opposite sides; by turning the stud through ninety degrees, the key held thereby may be removed from the support 1. A spring 5 secured at one end to the key and at the other end to stud 4 normally holds the key in its upper position. A swiveling slide-bar 6 is mounted for lengthwise movement in the lateral projection 2 and a similar projection 7 on support 1, this bar being adapted to move lengthwise, and also to turn in the openings in the parts 2 and 7 (Figs. 3 and 4). The slide-bar has openings therein, as shown in Fig. 19, of progressively increasing length, and the lower end 8 of each key from 2 to 8 is adapted to be projected through one of these openings when the key is depressed; also, when any one of these keys is depressed, a lateral projection 9 at the lower end thereof is adapted to engage the slide-bar 6 and rock that bar in its bearings against the tension of a spring 10. Secured to the slide-bar is a rod 11 which is connected by a spring 12 to the projection 2 and on projection 2 is a stud 13. When the slide-bar is in its normal position, as shown in Figs. 3 and 4, its end is in engagement with the end of stud 13 and the slide-bar is held against lengthwise movement actuated by spring 12, but when, on the depression of a key, the slide-bar is rocked by the projection 9 on the key, the slide-bar is released from engagement with the end of stud 13 and is then moved in the direction of its length by the spring 12. In the case of the depression of any key from 2 to 8, this lengthwise movement of the slide-bar will be arrested by the engagement of the lower end 8 of the key with the end of the opening in the slide bar through which that key is projected. The key number 9 has no projection 8 on its lower end (Fig. 3) but is provided with a lateral projection 9 for turning the slide-bar 6 and when this key is depressed the slide-bar moves in the direction of its length under the influence of spring 12 until the wall of the slide-bar, which normally engages the end of the stud 13, comes into engagement with the projection 2. No opening in the slide-bar is provided for the key number 1, but the projection 8 at the lower end of this key is adapted to arrest lengthwise movement of the slide-bar by engaging with the end of the wall of the slide-bar. The position of the lower end of the number 1 key with relation to the slide-bar is shown in Fig. 19. On each key is a projection 14 extending laterally in a direction opposite from the projection 9. The slide-bar is provided with a flange 15 at its upper edge. The lower wall of the slide-bar is engaged by the lateral projection 9 of a key after the lateral projection 14 has passed below the flange 15 and when the slide-bar is rocked in its bearings by the projection 9 of a key, the flange 15 will be carried over the projection 14 of that key so as to hold the key in its depressed position until the slide-bar has been rocked back to its normal position. Also when the slide bar has been rocked by the depression of a key, the flange 15 is carried under the projections 14 on all of the other keys of the row so that it will serve to preclude depression of any one of such keys. The spring 10 for rocking the slide-bar in its bearings is connected at one end to a tang on the slide-bar and at the other to the rod 11.

Upon the support 1 is a stud 16 of a length corresponding to the lateral projection 2 and serving as a spacer for separating one unit from the other the required distance. This stud forms a pivot for a gear 17 and also for a pawl-carrying lever 18 on which a pawl 19 is pivotally mounted. The pawl has a pin 20 thereon passing through a slot in the lever 18 and a spring 21 connects this pin to a stud on the lever 18 so that the spring tends to turn the pawl on its pivot in the direction to carry the tooth of the pawl into engagement with the teeth of the gear 17. The tooth of the pawl is so shaped that the pawl will slide over the teeth of the gear 17 when it is turning about stud 16 in a clockwise direction, but when moving in the opposite direction the pawl will carry the gear 17 with it. The pawl-carrying lever 18 is pivotally connected at 22 to the end of the bar 11 so that when a key is depressed and the slide-bar together with the bar 11 are moved in the direction of their length, the pawl 19 will be carried around gear 17 a distance commensurate with the value of the key depressed, but during such movement the gear 17 will not be actuated as the pawl slides over the teeth of the gear and as movement of the gear is obstructed by a detent 23 pivotally mounted upon the support 1 and pressed into engagement with the gear by a suitable spring.

A suitable number of the units thus constructed are assembled side by side in a suitable casing, the several units being secured together by tie-bars passing through openings in the supports 1. In Fig. 1, eight such units are shown assembled in a casing, the two at the right being for units and tens of cents and the six units at the left being for dollars. The setting of the parts for an operation consists in depressing one key in each row and thereby moving the pawl 19 corresponding to each key about the gear 17 with which that pawl coacts a distance dependent upon the value of the key depressed. Thereafter the operating device of the machine is actuated to return all of the pawls 19 to their initial positions in which position the pawl in Fig. 3 is shown, thereby actuating all of the gears 17 amounts commensurate with the values of the depressed keys in the rows corresponding respectively to the several gear-wheels.

The operating device in the machine illustrated consists of an operating handle 24 (Figs. 1 and 13) which is pivotally mounted upon a stud 25 in axial alinement with the several studs 16 of the several units, this stud 25 projecting through the side frame of the machine. The lower end of this operating handle is extended to form a sector-gear 26. At the opposite side of the machine a similar sector-gear 27 (Fig. 12) is pivotally mounted in axial alinement with handle 24 on a stud extending between the side frame of the machine and an adjacent plate 28 (Fig. 1). These two sector gears mesh with pinions 29 carried by a shaft 30 which is rotatable in bearings formed in the side frames of the machine. The two sector-gears 26 and 27 have brackets secured thereto which carry an operating rod 31. This rod 31 extends across the machine and is adapted to engage all of the pawl-carrying arms 18 so as to move those arms from the positions to which they were moved in setting up a number back to their normal positions as indicated in Fig. 3. The normal position of rod 31 is indicated in full lines in Fig. 21. When the operating handle 24 is moved, rod 31 is carried in the direction of the arrow in Fig. 21 to the position shown by the dotted lines in that figure. In so moving, rod 31 engages all of the pawl-carrying arms 18 so as to move those arms with it, but just before engaging any one of the pawl-carrying arms 18, the rod moves over the pawl 19 carried by that arm so as to hold the pawl in engagement with its corresponding gear-wheel 17. By reason of the gear connections between the two sectors 26 and 27 through the shaft 30, the two ends of rod 31 are compelled to move in unison.

The direction of the forward stroke of the operating lever 24 is indicated by the arrow in Fig. 13, and this movement of the lever is effected against the tension of a spring 32 connected at one end to arm 24 and at the other end to the adjacent side frame. When lever 24 has completed its stroke in this direction it is returned to its initial position by spring 32. A full stroke of the operating arm 24 in both directions is insured by a pivoted spring-actuated lever 33 (Fig. 13) coacting with teeth 34 on the lever 24 in a manner well understood.

If a mistake has been made in setting up a number, correction can be made as follows: Pivotally mounted on each stud 16 is a plate 35 (Fig. 21) having a sector-gear formed thereon, the teeth of which are adapted to be engaged by teeth on a slide 36 provided with slots through which pins 37 on the support 1 pass. A spring 38 normally holds the slide 36 in the position in which it is shown in Fig. 21. Secured to the plate 35 is an arm 39 the outer end of which is beveled and is adapted to engage with the pin 20 on the pawl 19. A bail 40 is pivotally mounted upon the side frames of the machine and at one end is provided with an operating handle 41 whereby it may be turned on its pivots against the tension of a spring 42 connecting the bail to a stud on the side frame. By depressing the key 41 the bail 40 may be turned in a counter-clockwise direction and thus be caused to engage the ends of all of the slides 36 and move those slides against the tension of their springs 38. When the slides so move, the teeth thereon engage the teeth of the sectors 35 and thus carry the ends of arms 39 into engagement with the pins 20 on pawls 19. The inclined ends of arms 39 act upon the pins 20 so as to turn the pawls 19 on their pivots sufficient to carry the teeth of the pawls out of engagement with their gears 17 and when such turning movement of the pawls is arrested by the pins 20 coming into engagement with the ends of the slots through which they extend, the further movement of arms 39 about the studs 16 carries the pawl carrying arms 18 and the pawls carried thereby back to their initial positions. When such positions are reached the springs 10 acting upon the slide-bars rock the slide-bars so that they will be held against the tension of their springs 12 in the manner heretofore described.

A repeat key is provided for use in multiplying as shown at 43 in Figs. 1 and 17. Referring to Figs. 14 and 15, it will be seen that each of the studs 13 for holding the slide-bars against lengthwise movement has a plunger 44 therein actuated by a spring 45 to carry its end beyond the end of the stud 13. The plungers 44 are normally held with their ends flush with the ends of studs 13 by the rod 46 carried by arms 47 secured to a shaft 48 upon which the repeat key 43 is secured. A spring 49 is connected to one of the arms 47 and to a stud on the side frame and normally holds the parts in the position in which they are shown in Figs. 14 and 17, but by depressing the repeat key 43 the plungers 44 are moved by their springs 45 from the position shown in Fig. 14 to the position shown in Fig. 15 in which latter position the ends of plungers 44 project beyond the ends of the studs 13. When the plungers 44 do so project the operating handle may be operated any desired number of times without causing the slide-bars 6 to be retained in their initial positions when they are moved forward to those positions, as the walls of the slide-bars which normally engage the ends of the studs 13 will not be carried far enough to pass the ends of the plungers 44. Therefore during the return movement of the operating lever the slide-bars will return to the positions to which they were moved in setting up the number, in which positions they will be arrested by the depressed keys, the keys depressed being retained in their depressed positions by the flanges 15 on the slide-bars coacting with the lateral projections 14 on the keys.

Each gear wheel 17 meshes with a pinion 50 to which is secured a number-wheel 51 the periphery of which is provided with numbers from zero to nine inclusive, which numbers are adapted to be exhibited through openings in the casing of the machine, as shown in Fig. 1. Each number-wheel has a cam 52 (Fig. 21) secured thereto with which coacts a lever 53 pivotally mounted adjacent to the number-wheel upon the support 1. A spring 55 is connected at one end to the lever 53 and at the other end to a stud on the support 1 to hold one end of lever 53 always in engagement with cam 52. All of the pinions 50 with their number-wheels 51 are mounted upon a shaft 54 which extends across the machine and to which the pinions 50 may be locked when necessary to set the number-wheels 51 at the zero position, and an interlock is provided between shaft 54 and the handle 24 to prevent the movement of the operating handle during the operation of resetting. The construction I prefer for this purpose is that illustrated in Patent No. 966,410 dated August 2, 1910.

The carrying mechanism will now be described. This mechanism is controlled by the levers 53 of the several units and is such that when the number-wheel of one unit passes from the 9 to the zero position the number-wheel of the next higher unit will be actuated one step. The cam 52 of each unit has a single tooth or projection thereon such that as the corresponding number-wheel is passing from 9 to the zero position this tooth or projection will rock the corresponding lever 53 on its pivot. The downwardly extending arm of the lever 53 is connected through a slot in the support 1 (Figs. 5 and 6) to a link 56 which is mounted upon the support 1 by means of a link 57 pivotally connected at one end to link 56 and at the other to support 1. The lower end of link 56 is pivotally connected to a latch 58 provided with a tooth at one end and at the other end curved so as to coact with a pin 59 on the support 1; this latter end of the latch 58 is connected by a spring 60 to a stud on support 1. Mounted upon the support 1 is a stud 61 which forms a pivotal support for a lever 62. At one end this lever is provided with a lateral projection 63 with which the tooth 64 of the latch 58 coacts to hold lever 62 in the position in which it is shown in Fig. 6 against the tension of a retractile spring which normally acts to turn lever 62 in a clock-wise direction as that lever is shown in Figs. 5 and 6. This spring is shown at 65. A pawl 66 is pivotally mounted upon the upper end of the lever 62 just below the projection 63. This pawl is adapted to coact with the gear-wheel 17 of the unit next adjacent to the one upon which the pawl 66 is mounted. The pawl is normally held in engagement with the gear-wheel by a spring 67 connected to a rearward extension of the pawl and to a projection on the lever 62. During the forward stroke of the operating lever the number-wheels are actuated in the manner above described and if any wheel passes from the 9 to the zero position the cam 62 thereof will act through the lever 53 upon the link 56 to raise the lower end of the link and thereby turn the latch 58 about the pin 59 as a pivot until the latch disengages the projection 63 upon the lever 62 whereupon lever 62 will be turned about its pivot by its spring 65. When lever 62 so turns it carries pawl 66 with it and the distance through which lever 62 turns is such that pawl 66 is carried into engagement with the next adjacent tooth of the gear-wheel 17. During the return stroke of the operating handle the levers 62 are turned in the opposite direction against the tension of their springs 65 to restore them to their initial positions in which positions they are held by the latches 58, and in being so restored the levers 62 move the pawls 66 so as to cause those pawls to turn their corresponding gear-wheels 17 a distance represented by one tooth of those wheels.

Pivotally mounted at one end of each lever 62 is a finger 68 held by a spring 69 against a projection 70 on the lever, so that the finger can turn in one direction against the tension of spring 69 but is prevented from turning in the opposite direction by projection 70. The fingers 68 of the levers 62 are adapted to be engaged by fingers 71 mounted upon the shaft 30 heretofore referred to. The several fingers 71 are arranged in a spiral about the shaft 30 as shown in Fig. 16. During the forward movement of the operating handle the fingers 71 move in a counter-clockwise direction as shown in Figs. 5 and 6 and they engage and operate the fingers 68, but do not operate the levers 62. During the return movement of the operating handle, the fingers 71 move in a clockwise direction as shown in Figs. 5 and 6 and they may then engage the fingers 68 and rock the levers 62 upon their pivots 61 so as to cause pawls 66 on the levers 62 to actuate the wheels 17 and carry the levers 62 back to their initial positions in which they are held by latches 58. Fig. 6 shows the normal position of these parts. The lever 53 bears upon the circular portion of cam 52 and the lever 62 is held by the latch 58. During the forward stroke of the operating lever, the finger 71 will be turned in a counterclockwise direction and be carried past the finger 68. If, during this forward stroke of the operating lever, the tooth of the cam 52 is not caused to operate the lever 53, then on the return movement of the operating handle, the lever 62 will not be actuated to a material extent and the finger 71 will move past the finger 68; but if during the forward stroke of the operating handle the number-wheel passes from nine to the zero position, the lever 53 will be actuated and will cause the latch 58 to release lever 62 whereupon the lever will turn on its pivot a sufficient distance to carry pawl 66 backwardly into coaction with the next tooth of the wheel 17. When these operations have taken place the parts will be in the position in which they are shown in Fig. 5. Now when the operating handle is moved through the return stroke, the finger 71 will be turned in a clockwise direction, will engage finger 68 and will rock lever 62 thereby causing the pawl 66 on lever 62 to turn the gear wheel 17 of the unit of the next higher order through a distance equal to one tooth of that wheel, and at the end of such movement of lever 62 that lever will be held by the latch 58, the parts being thus restored to the Fig. 6 position.

In Figs. 5 and 6 the gear wheel 17 shown in full lines is the wheel of the unit of next higher order than the one whose carrying mechanism is shown. Fig. 7 is a view of substantially the same parts as are shown in Figs. 5 and 6 viewed in a direction opposite from that in which those parts are seen in Figs. 5 and 6. In Fig. 7, the gear-wheel 17 and number-wheel 51 belong to the unit of next higher order than the one including the carrying mechanism which is shown in detail.

As above stated, the fingers 71 on shaft 30 are arranged in a spiral about that shaft. This arrangement is such that on the return movement of the operating lever the finger 71 at the extreme right of the machine is the first one to engage and operate its lever 62 and the other levers 62 are engaged and operated by their fingers 71 successively from right to left. By reason of this provision, if the operation of the machine results in carrying over from one order to the next higher order at a time when the mechanism for that next higher order is in the "nine" position the complete carrying operation will be performed.

In addition to actuating the wheels 17 to carry from one order to the next higher order, means are provided for arresting rotation of the wheels 17 at the end of the carrying movement so as to prevent overthrow of those wheels due to momentum. Such overthrow is prevented by arms 72 pivotally mounted upon the studs 61 and adapted to be moved into and out of engagement with teeth of the gears 17. Each of these arms is acted upon by a spring 73 to turn its free end toward the corresponding gear 17. At times such movement of arm 72 is prevented by a lateral projection 74 upon the lever 62 against which projection the edge of arm 72 abuts. At other times the arm 72 is held out of engagement with the wheel 17 by a detent 75 pivotally mounted at 76 upon the support 1 and coacting with a stud 77 upon the inner side of the arm 72. At other times the arm 72 may be turned about stud 61 by spring 73 to cause its end to engage wheel 17 and prevent rotation thereof. The normal position of these parts is shown in full lines in Fig. 6, the arm 72 being held away from wheel 17 by detent 75. Fig. 5 shows the position of these parts after the lever 62 has been released by latch 58, the arm 72 being then held away from wheel 17 by projection 74 on lever 62. The dotted lines in Fig. 6 show the position of lever 72 after it has been moved into engagement with wheel 17.

The three positions of the arm 72 and detent 75 are shown in Figs. 8, 9 and 10 to which reference will now be made. These three figures show the side of lever 72 opposite from that shown in Figs. 5 and 6, the stud 77 on the arm being shown in full lines. The detent 75 is acted upon by a spring 78 connected thereto and to a stud on lever 62, to move detent 75 into coaction with pin 77. Such coaction is prevented at times by a stud 79 on lever 62. Fig. 8 shows the position of the parts in which they are shown in Fig. 6; the detent 75 is in engagement with pin 77 and thereby holds arm 72 against rotation caused by its spring 73 in a clockwise direction, as the parts are seen in Fig. 8, so as to carry arm 72 into engagement with wheel 17. When the number-wheel passes from the 9 to the zero position, latch 58 is actuated to release lever 62 and lever 62 is turned on its pivot 61 to carry pawl 66 back one notch on wheel 17. The parts are thus carried to the positions shown in Figs. 5 and 9. The movement of lever 62 about its pivot carries the projection 74 thereon into engagement with arm 72 so as to hold that arm in substantially the same position it was in before, out of engagement with wheel 17. Furthermore, as the lever 62 moves thus, the pin 79 thereon engages the inclined wall of the detent 75 and raises that detent against the tension of its spring 78 so as to carry it out of coaction with pin 77. The movements of the parts from the Figs. 8 and 6 position to the Figs. 9 and 5 positions are effected during the forward stroke of the operating handle, which stroke carries the operating rod 31 from the position in which it is shown in Fig. 8 around to the right. During the return movement of the operating handle, when the lever 62 is rocked on its pivot to cause pawl 66 to operate gear 17, the arm 72 turns with lever 62 under the tension of its spring 73, so that just as the pawl 66 completes the operation of turning gear 17 a distance equal to one tooth thereof, the arm 72 engages gear 17 and precludes further turning movement of the latter. The parts are then in the position shown in Fig. 10. This movement of arm 72 carries the pin 77 under the end of detent 75 and this movement of lever 62 carries the pin 79 around far enough to provide a clearance between it and the adjacent, inclined, lower edge of the detent 75, as shown in Fig. 10. The arm 72 having thus been moved to arrest rotation of the gear 17 at the end of the carrying movement of that gear, it is necessary to retract the arm 72 in order that further operation of the wheel 17 may take place. This is effected by means of rod 31. The return movement of the operating handle carries the rod 31 back to the position in which it is shown in Figs. 6 and 8 and just before reaching this position the rod 31 engages the lateral projections 80 upon the arms 72 of all the carrying mechanisms that have been actuated during the forward stroke of handle 24. Thus, the last portion of the return movement of rod 31 moves the arm 72 from the position shown by the dotted lines in Fig. 6 to the position shown by the full lines in that figure and in Fig. 10, turning arm 72 against the tension of spring 73; this return movement of arm 72 carries the pin 77 thereon under the notch in detent 75 and the detent is actuated by its spring 78 to engage the stud 77 and thus hold arm 72 in its retracted position, this movement of the detent being permitted by stud 79 since that stud has been moved laterally after having actuated the detent 75 by coaction with the inclined wall of the latter.

To recapitulate, the forward or downward movement of the operating handle causes operation of the number-wheels to an extent commensurate with the value of the depressed keys corresponding respectively to the number-wheels; if in such movement of a number-wheel that wheel passes from the nine to the zero position, it will act through its lever 53 and link 56 to release the latch 58 controlling the lever 62 whose pawl 66 is adapted to actuate the wheel 17 of the next higher numerical order; on the return movement of the operating handle all of the levers 62 which have been so released are actuated by the fingers 71 successively from right to the left of the machine to move their pawls 66 and thereby the appropriate wheels 17 forward a distance equal to one tooth, at the end of which movements further rotation of the wheels 17 is precluded by the arms 72; the movement of the levers 62 to actuate the wheels 17 results in resetting the levers 62 for further operation, for the levers will be held in the positions to which they are moved by the latches 58; and at the end of the return movement of the operating handle the rod 31 actuates the arms 72 to cause those arms to release the wheels 17 and the arms will be held in the retracted positions to which they are so moved by the spring actuated detents 75.

The printing mechanism will now be described. This mechanism is such that any number set up by the depression of keys in the several columns will be automatically printed upon a paper strip, the printing mechanism being actuated by the movement of the operating handle 24. The printing mechanism herein shown and described is such that when no key is depressed in the two columns at the right of the machine for units and tens of cents, zeros will be printed in those columns automatically. As to the other columns, however, if it be desired to print zeros, suitable zero keys must be depressed for this purpose.

The base of the machine has standards 81 (Fig. 17) formed thereon which support a rod 82 upon which a plurality of printing members 83 are pivotally mounted, one of these printing members 83 being provided for each column, that is, one for each row of keys. The printing members are sectors having type from zero to nine formed on the curved edge thereof, as shown. Each sector 83 is secured to a downwardly extending arm 84 the lower end of which is pivotally connected to the end of a rod 85; the other ends of these rods are connected to the rods 11 which move lengthwise of the machine with the slide-bars 6. Since the slide-bars and rods 11 are spaced apart laterally considerably more than it is desirable to have the printing members 83 separated, pivotally mounted bridges or bails 86 are provided for connecting the rods 85 with their respective bars 11. These bridges are shown in Fig. 16; they are mounted loosely upon rods 87 extending between the side-frames of the machine and the upwardly extending ends of each bail 86 are connected one to the rod 85 and one to the corresponding rod 11. The two cents columns of keys at the right of the machine are not provided with zero keys and the rods 85 for these two columns are connected to the arms 84 of the printing members 83 by simple pivotal connections. The printing members 83 for these two columns are normally in such positions that the zero types thereon are at the printing line as indicated in Fig. 18. The other columns of keys, however, do include zero keys, as shown at 88 in Figs. 1, 3 and 17. These zero keys 88 do not actuate the slide-bars 6 when they are depressed; their sole function is to position the corresponding printing members 83 for printing from the zero types thereon. In all the mechanisms for printing in the dollars columns wherein movement of the printing members 83 is necessary to print zeros, the connection between the rods 85 and arms 84 is not a simple pivotal connection but is a pin and slot connection permitting movement of the printing member 83 independently of the rod 85 sufficient to carry the zero type upon the printing member into and out of the printing position. This pin and slot connection is shown in Figs. 17 and 20. The arm 84 has a pin 89 thereon passing through a slot in the rod 85. Upon the side of rod 85 opposite arm 84 is a strip 90 into which the pin 89 fits tightly. A spring 91 connects pin 90 to a stud on rod 85. Extending between the supports 81 is a rod 92 forming a pivotal support for a plurality of bell-crank levers 93, one for each of the members 83 for printing in the dollars columns. One end of each of these levers 93 is provided with a tooth adapted to engage a projection on the lower end of the corresponding arm 84; the opposite end of each lever 93 is connected by rod 94 to a bell-crank lever 95 pivotally mounted upon the rod 96 extending between the side frames of the machine. The opposite ends of these bell-crank levers 95 extend under the lower ends of the zero keys 88. Thus by depressing any zero key 88 the bell-crank lever 93 corresponding thereto may be operated through the lever 95 and rod 94 to cause lever 93 to disengage its arm 84; when this occurs the corresponding printing member 83 will be turned on its pivot by the spring 91 acting through the strip 90, pin 89 and arm 84 as far as is permitted by the length of the slot through which pin 89 extends. This movement of the printing member 83 is sufficient to carry the zero type thereon to the printing point; referring to Fig. 18 this movement is sufficient to carry the zero type on one of the members 83 for printing in a dollars column downwardly into alinement with the two zero type of the members 83 for printing in the cents columns. All the printing members 83 for printing in the dollars columns are provided with hooks 97 at their upper ends extending into the path of movement of the operating rod 31. The printing takes place during the early portion of the forward stroke of the operating handle during which stroke rod 31 is moved from the position in which it is shown in Fig. 17, around to the right; at the end of this movement the rod engages the hooks 97 of all of the members 83 for printing in dollars columns which have been employed in printing, and the rod raises all such printing members 83 to restore them to their initial positions with the zero type thereon above the printing line. At the end of such restoration of the printing members 83, the arms 84 thereof are engaged by the bell-cranks 93 so that the printing members are thereby held in their initial positions. The bell-cranks 93 are for this purpose actuated by springs 98 connected thereto and to the base of the machine and these springs serve to position the rods 94 and bell-cranks 95.

On each of the slide-bars 6 of the units for printing in the dollars columns, is a projection 98 directly overlying the bell-crank lever 95 corresponding to that column. Therefore, when a key is depressed and the slide-bar rocked in its bearings, the projection 98 engages and rocks the bell-crank lever 95 and thereby operates the lever 93 to release the arm 84. Thus, the levers 93 of the mechanisms for printing in all of the dollars columns are actuated whenever any keys in the columns corresponding respectively thereto are actuated. Due to the actuation of the bell-crank levers 93, the corresponding printing-members 83 move downwardly sufficient to carry the zeros thereon to the printing line, and further movement of the printing-members 83 is determined by the extent of movement of the slide-bars 6 and therefore by the value of the keys depressed.

The rear edge of the curved portion of each of the printing-members 83 is provided with a plurality of notches, one for each of the type formed on the outer edge of the member. An alining device 99 (Fig. 17) is arranged to be moved so as to enter these notches and thereby bring the members 83 into accurate alinement, ready for printing. This alining device 99 is carried by arms 100 pivotally mounted upon a shaft 101, which is mounted for rotation in bearings formed in the base of the machine. One of these arms is extended downwardly below the shaft 101, and has a spring 102 connected thereto, the other end of the spring being connected to the base. Spring 102 normally acts to move the alining device 99 into the notches in the printing-members 83. The operating mechanism for the alining device 99 is shown in Fig. 13. Shaft 101 has an arm 103 secured thereon and extending upwardly therefrom, the upper end of this arm being connected by a pin-and-slot connection to a link 104 whose other end is pivotally connected to a link 105 pivotally mounted upon the adjacent side-frame of the machine. The upper edge of link 104 has a notch therein, the end of which is adapted to be engaged by a pin 106 mounted upon the lower enlarged portion 26 of the operating lever 24. During the first part of the forward movement of the operating lever 24, pin 106 engages and operates the link 104, so as to move the alining device 99 into the notches in the members 83.

After the printing has been effected, in the first portion of the forward movement of the lever 24, as hereinafter described, the pin 106 disengages the link 104, and the latter, together with the alining device 99, is returned to its initial position by a spring 107 connected at one end to links 104 and 105 and at the other end to a pin on the adjacent side-frame of the machine. The slot at the end of link 104, employed for connecting that link with the arm 103, is provided so that if movement of the alining device is arrested before pin 106 leaves the notch in the edge of link 104 the movement of the link may be continued independently of the alining device. This slot is open at one end to the upper edge of the link, as shown in Fig. 13, and a spring 108 connects the adjacent ends of link 104 and arm 103. By reason of this provision, when the operating lever 24 is making its return movement, the pin 106 thereon can engage and depress the link 104, straining the spring 108 until the pin 106 drops into its notch in link 104.

The printing is effected by a platen 109, preferably provided with a strip of rubber at its operating face. This platen is carried by arms 110 pivotally mounted on pins 111 which are supported upon the base 1. One of the arms 110 is extended downwardly below the pivot and a spring 112 is connected at one end to this extension and at the other end to the base of the machine, so that this spring normally acts to retract the platen. The platen is moved forwardly by two cams 113 mounted upon a shaft 114 and adapted to engage the arms 110. The shaft 114 is mounted for rocking movement in bearings formed on the base of the machine, and at one end this shaft has an arm 115 secured thereto, as shown in Fig. 13. Pivotally mounted on the end of arm 115 is a finger 116 actuated by a spring 117 to hold it normally in a position such that movement actuated by the spring is arrested by a stop 118 on the arm 115. The finger 116 is adapted to be engaged by a stud 119 on the operating lever 24. Thus during the forward stroke of the lever 24, the arm 115 is actuated by the stud 119 to rock shaft 114 and the cams 113 thereon, and these cams engage the arms 110 and thus move the platen forwardly with sufficient pressure to effect the printing.

The figures are printed upon a strip of paper which is guided through the machine as shown in Fig. 17, where the strip is designated 120. The strip passes under a guide-bar 121 and a guide-roller 122, the latter being mounted upon a shaft extending between the arms 110. The strip then passes upwardly between the platen 109 and the printing-members 83, and then between a pair of sheet-feeding-rollers 123 and 124. These rollers are suitably mounted in extensions 125 of the base of the machine, and their shafts are provided with intermeshing gears 126 (Figs. 1 and 16), so that the two rollers are made to move in unison. The shaft of one of the rollers is extended through the side-frame of the machine and provided with an operating handle 127 (Fig. 16) for convenience in threading the paper-strip through the machine. The paper-strip is fed along automatically, after each printing operation, by means of the devices illustrated in Fig. 12. The shaft on which the handle 127 is mounted has a ratchet-gear 128 secured thereto adjacent to the side-frame of the machine. This ratchet-gear 128 is actuated intermittently by a pawl 129 pivotally mounted on a pawl-carrier 130, which is loose upon the shaft 131 upon which the gear 128 is secured. A link 132 is pivotally connected to the carrier 130 and to a link 133 pivotally mounted upon the side-frame. In the upper edge of link 132 is a notch adapted to receive a pin 134 on the sector 27. A spring 135 is connected at one end to link 132 and at the other to a stud on the adjacent side-frame. During the forward movement of the operating handle of the machine and the corresponding movement of the sector 27, the pin 134 is carried away from the shoulder at the end of the notch in link 132, and spring 135 then moves link 132 and with it pawl 129, so that the pawl is carried around the ratchet-gear 128, slipping over the teeth of the ratchet. During the return movement of the operating handle and the sector 27, the pin 134 engages the shoulder at the end of the notch in link 132 and moves the link, together with pawl 129, in the opposite direction, and the pawl carries with it the gear 128, thereby actuating the strip-feeding rollers 123 and 124.

The ink for printing is supplied by an ink-ribbon 136 (Fig. 16), which passes between the platen 109 and the printing-members 83. The ends of this ink-ribbon are wound on reels 137 and 138, which are journaled for rotation on studs projecting upwardly from the base of the machine. The reel 138 is secured to a gear 139 adapted to be actuated by a pawl 140 pivotally mounted upon an arm 141 which is loose on the stud about which the reel 138 rotates. A spring 142 is connected at one end to the pawl 140 and at the other to a projection on the base of the machine, this spring being so arranged that it not only serves to hold the pawl in engagement with gear 139 but also retracts arm 141, when the latter is disengaged, until the movement of the arm is arrested by a stud 143 on the base of the machine. The link 132 (Fig. 12) has a projection 144 thereon, which is adapted to engage the pin 145, which pivotally connects the pawl 140 and arm 141. Thus, when link 132 moves rearwardly as above described, the arm 141 is released by projection 144 and is retracted by spring 142. During the forward movement of link 132, projection 144 engages stud 145 and actuates the pawl 140, so as to cause rotation of gear 139 and reel 138, and thereby feed the ink-ribbon in the direction of its length.

The operations performed in printing will be understood from the foregoing description. To summarize,—when setting up a number, by depressing keys in the several rows upon the keyboard, the printing-members 83 are moved to positions such that the type thereon corresponding to the values of the keys depressed will be carried to the printing line. If no keys in the rows for units and tens of cents are depressed, then the printing-members 83 for those columns will not be moved but will remain in the positions in which they are shown in Fig. 18, in which positions they will print zeros. If a zero is to be printed in any other column, the zero key 88, for that column is depressed, operating through the lever 95 and rod 94 to cause the corresponding lever 93 to disengage its printing-member and allow that member to move downwardly one step to carry its zero type to the printing line. If any other number is to be printed, the appropriate key is depressed, and not only are the parts 95, 94 and 93 operated by the projection 98 on the slide-bar for that key, but also the slide-bar is released and allowed to move in the direction of its length. As the slide-bar moves thus, it carries with it the rod 85 and thus moves the corresponding printing-member 83 to the proper position. The operating handle is then moved forwardly, and in the first part of this movement the alining device 99 is caused to move into the notches of the several printing-members 83, so as to properly aline those members. Further movement of the operating handle causes actuation of the platen 109, to print the number upon the paper-strip. During the return movement of the operating handle, the paper-strip 120 is fed along in the direction of its length by the operation of the feeding-rollers 123 and 124, and the ink-ribbon is fed along in the direction of its length by the rotation of the reel 138. Also during the forward movement of handle 24 and after the printing has been effected, the slide-bars 6 are carried back to their original positions, and in such movement operate, through the rods 85, to restore the printing-members 83. At the end of this forward movement of the operating handle, the rod 31 engages the hooks 97 of all of the printing-members 83 for printing in the dollars columns, to raise those members a sufficient distance to permit the arms 84 thereof to be engaged and held by the bell-crank levers 93.

The paper-strip is drawn from a roll on the reel 148, whose trunnions are received in notches in a frame 149 (Fig. 13). The sides of this frame have trunnions, 150, thereon, which may be sprung into openings provided therefor in the base of the machine. Secured to the frame 149 are stops 151, which abut against the base of the machine to limit the turning movement of frame 149.

Having described my invention, what I claim as new therein and desire to secure by Letters Patent of the United States is:

1. A calculating machine comprising the combination of a row of keys, a pivoted slide-bar, a stop for holding the slide-bar against longitudinal movement, said bar being released from the stop by the depression of a key, and means for varying the effective length of the stop, substantially as set forth.

2. A calculating machine comprising the combination of a row of keys, a pivoted slide-bar coöperating therewith, means for moving the slide-bar in one direction, an operating device for moving the slide-bar in the other direction, a retaining device for holding the slide-bar in the position to which it is moved by said operating device, a spring for turning the slide-bar on its pivot to cause coaction thereof with the retaining device, and means for preventing turning movement of the slide-bar on its pivot to prevent coaction of the slide-bar with the retaining device, substantially as set forth.

3. A calculating machine comprising the combination of a row of keys, a slide-bar coöperating therewith, means for moving the slide-bar in one direction, a reciprocating operating device, means actuated by said device when moving in one direction for moving the slide-bar in correspondence with it, said slide-bar being also adapted to move with the operating device during the reverse stroke thereof, a holding device for automatically retaining the slide-bar against movement with said operating device during the reverse stroke of the latter, and means for rendering the holding device operative or inoperative, substantially as set forth.

4. A calculating machine comprising the combination of a row of keys, a pivoted slide-bar coacting therewith, a stop for holding the slide-bar until it is turned on its pivots by the depression of a key, an operating device for moving the slide-bar, and means for rendering the stop effective or ineffective, substantially as set forth.

5. A calculating machine comprising the combination of a row of keys, a pivoted slide-bar coacting therewith, a stop for holding the slide-bar until it is turned on its pivots by the depression of a key, a spring for moving the slide-bar in one direction when it is released from the stop, an operating device for moving the slide-bar in the other direction, a spring for turning the slide-bar when so moved to cause it to be held by said stop, and means for varying the effective length of the stop, substantially as set forth.

6. A calculating machine comprising the combination of a support, a gear rotatable thereon, a pawl rotatable concentric with the gear, keys for positioning the pawl, means for actuating the pawl, an arm rotatable concentric with the pawl and adapted to engage and actuate the pawl, a spring-actuated slide mounted for sliding movement on the support and adapted to actuate said arm, a pivotally mounted arm adapted to engage the slide and a key for actuating said last-named arm, substantially as set forth.

7. A calculating machine comprising the combination of a plurality of rotatable gears, a pawl for each gear rotatable concentric therewith and adapted to engage and operate the gear, a row of keys for each gear adapted to position the pawl thereof, an operating device for returning all the pawls to initial position, a second pawl for each gear positioned with respect to the gear by the rotation of the gear of the next lower order, means for operating said last-named pawls to turn the gears engaged thereby one step, and stops movable with said last-named pawls and engaging the gears to prevent overthrow thereof, substantially as set forth.

8. A calculating machine comprising the combination of a plurality of rotatable gears, a pawl for each gear rotatable concentric therewith and adapted to engage and operate the gear, a row of keys for each gear adapted to position the pawl thereof, a reciprocating operating device the forward stroke of which returns all the pawls to initial position, a second pawl for each gear positioned with respect to the gear by the rotation of the gear of the next lower order, and means actuated by said operating device during the return stroke thereof for operating said last-named pawls to turn the gears engaged thereby one step, substantially as set forth.

9. A calculating machine comprising the combination of a plurality of rotatable gears, a pawl for each gear rotatable concentric therewith and adapted to engage and operate the gear, a row of keys for each gear adapted to position the pawl thereof, a reciprocating operating device the forward stroke of which returns all the pawls to initial position, a second pawl for each gear positioned with respect to the gear by the rotation of the gear of the next lower order, and means actuated by said operating device during the return stroke thereof for operating said last-named pawls successively from right to left of the machine to turn the gears engaged thereby one step, substantially as set forth.

10. A calculating machine comprising the combination of a plurality of rotatable gears, a pawl for each gear rotatable concentric therewith and adapted to engage and operate the gear, a row of keys for each gear adapted to position the pawl thereof, a reciprocating operating device the forward stroke of which returns all the pawls to initial position, a second pawl for each gear positioned with respect to the gear by the rotation of the gear of the next lower order, means actuated by said operating device during the return stroke thereof for operating said last-named pawls successively from right to left of the machine to turn the gears engaged thereby one step, and stops movable with said last-named pawls and engaging the gears to prevent overthrow thereof, substantially as set forth.

11. A calculating machine comprising the combination of a plurality of rotatable gears, a pawl for each gear rotatable concentric therewith and adapted to engage and operate the gear, a row of keys for each gear adapted to position the pawl thereof, a reciprocating operating device the forward stroke of which returns all the pawls to initial position, a second pawl for each gear positioned with respect to the gear by the rotation of the gear of the next lower order, means actuated by said operating device during the return stroke thereof for operating said last-named pawls to turn the gears engaged thereby one step, stops movable with said last-named pawls and engaging the gears to prevent overthrow thereof, and means actuated by said operating device at the end of said return stroke for disengaging said stops from their gears, substantially as set forth.

12. A calculating machine comprising the combination of a plurality of rotatable gears, a pawl for each gear rotatable concentric therewith and adapted to engage and operate the gear, a row of keys for each gear adapted to position the pawl thereof, an operating device for returning all the pawls to initial position, a second pawl for each gear positioned with respect to the gear by the rotation of the gear of next lower order, a shaft rotated by said operating device, and means on said shaft for engaging and operating said last-named pawls successively from right to left of the machine, substantially as set forth.

13. A calculating machine comprising the combination of a plurality of rotatable gears, a pawl for each gear rotatable concentric therewith and adapted to engage and operate the gear, a row of keys for each gear adapted to position the pawl thereof, a reciprocating operating device the forward stroke of which returns all the pawls to initial position, a second pawl for each gear positioned with respect to the gear by the rotation of the gear of the next lower order, a shaft rotated as said operating device is moved, and means on said shaft for engaging and operating said last-named pawls successively from right to left during the return stroke of said operating device, substantially as set forth.

14. A calculating machine comprising the combination of a plurality of rotatable gears, a pawl for each gear rotatable concentric therewith and adapted to engage and operate the gear, a row of keys for each gear adapted to position the pawl thereof, a reciprocating operating device the forward stroke of which returns all the pawls to initial position, a second pawl for each gear positioned with respect to the gear by the rotation of the gear of the next lower order, a shaft rotated as said operating device is moved, means on said shaft for engaging and operating said last-named pawls successively from right to left during the return stroke of said operating device, stops moved with said last-named pawls to engage the gears and arrest rotation thereof, and means actuated by said operating device at the end of its return stroke for disengaging said stops from the gears, substantially as set forth.

15. The combination of two wheels, means for actuating the same, a pivoted lever, a pawl pivotally mounted thereon and engaging one of the wheels, a latch operated by the other wheel for holding said lever, a spring for operating the lever in one direction when released by said latch, means for operating the lever in the other direction to turn the wheel engaged by the pawl on the lever and carry the lever into coaction with the latch, a detent for limiting the movement of the wheel when turned by the pawl, said detent being movable into engagement with the wheel with said lever when the pawl on the lever is actuating the wheel, and means for restoring the detent independently of said lever, substantially as set forth.

16. The combination of two wheels, means for actuating the same, a pivoted lever, a pawl pivotally mounted thereon and engaging one of the wheels, a latch operated by the other wheel for holding said lever, a spring for operating the lever in one direction when released by said latch, means for operating the lever in the other direction to turn the wheel engaged by the pawl on the lever and to carry the lever into coaction with the latch, an arm movable into engagement with the wheel to prevent excessive movement thereof, and a latch for holding said arm out of engagement with the wheel, substantially as set forth.

17. The combination of two wheels, means for actuating the same, a pivoted lever, a pawl pivotally mounted thereon and engaging one of the wheels, a latch operated by the other wheel for holding said lever, a spring for operating the lever in one direction when released by said latch, means for operating the lever in the other direction to turn the wheel engaged by the pawl on the lever and carry the lever into coaction with the latch, an arm movable into engagement with the wheel to prevent excessive movement thereof, a latch for holding said arm out of engagement with the wheel, and means on said lever for operating said last-named latch, substantially as set forth.

18. A calculating machine comprising the combination of a row of keys, a printing member, two mechanisms for positioning said member for printing, means for operating one of said mechanisms by the movement of one of said keys, and means for operating both of said mechanisms by the movement of any one of the keys in the row other than said key, substantially as set forth.

19. A calculating machine comprising the combination of a plurality of rows of keys, a plurality of printing members having type thereon, one member for each row of keys, certain of said members being normally positioned for printing and certain others being normally out of position for printing, and mechanisms for positioning the printing members actuated by the depression of the keys, the said mechanisms being so constructed that movement of keys of the same value in different rows actuates the corresponding printing members different amounts, substantially as set forth.

20. A calculating machine comprising the combination of a plurality of rows of keys, a plurality of corresponding printing members having type thereon and having the zero type normally in printing position, means actuated by the keys for moving the corresponding printing members distances depending on the value of the operated keys, a second set of rows of keys, a plurality of corresponding printing members having type thereon and having the zero type normally out of printing position, and means actuated by the last-named keys for moving the corresponding printing members to carry the zero type thereon into printing position and additionally for moving those printing members distances depending on the value of the operated keys, substantially as set forth.

21. A calculating machine comprising the combination of a row of keys, a printing member, a connection from said keys to said member having provision for lost motion therein, a zero key and means actuated by the depression thereof for operating said member to the extent permitted by said lost motion, substantially as set forth.

22. A calculating machine comprising the combination of a row of keys, a slide-bar actuated by said keys amounts depending on the value of the operated key, a printing member, a connection from the slide-bar to the printing member having provision for lost motion therein, a zero key and means actuated by the depression of said key for operating said member to the extent permitted by said lost motion, substantially as set forth.

23. A calculating machine comprising the combination of a row of keys, a printing member, a connection from said keys to said member having lost motion therein, a zero key, and means actuated by the operation of said key for operating said member to the extent permitted by said lost motion to carry the zero type thereon to the printing position, substantially as set forth.

24. A calculating machine comprising the combination of a row of keys, a printing member, a connection from said keys to said member having lost motion therein, a zero key, means actuated by the operation of the zero key for operating the member to the extent permitted by said lost motion, and means actuated by the operation of any one of the keys of said row for operating said member to the extent permitted by said lost motion and additionally an amount depending on the value of the key depressed, substantially as set forth.

25. A calculating machine comprising the combination of a plurality of rows of keys, a plurality of printing members corresponding thereto, means for positioning the members for printing by the operation of the keys, and two mechanisms for restoring the printing members to normal position, one of which operates on all the printing members and the other of which operates on certain of the members but not on others, substantially as set forth.

26. A calculating machine comprising the combination of a row of keys, a printing member, two mechanisms for positioning said member for printing, means for operating one of said mechanisms by the movement of one of said keys, means for operating both of said mechanisms by the movement of any one of the keys in the row other than said key, and two mechanisms for restoring the printing member to normal position, substantially as set forth.

27. A calculating machine comprising the combination of a plurality of rows of keys, a plurality of printing members having type thereon, one member for each row of keys, certain of said members being normally positioned for printing and certain others being normally out of position for printing, mechanisms for positioning the printing members actuated by the depression of the keys, the said mechanisms being so constructed that movement of keys of the same value in different rows actuates the corresponding printing members different amounts, and two means for restoring the printing members to normal position one of which coacts with certain of the printing members but not with all, substantially as set forth.

28. A calculating machine comprising the combination of a plurality of rows of keys, a plurality of corresponding printing members having type thereon and having the zero type normally in printing position, means actuated by the keys for moving the corresponding printing members distances depending on the value of the operated keys, a second set of rows of keys, a plurality of corresponding printing members having type thereon and having the zero type normally out of printing position, means actuated by the last-named keys for moving the corresponding printing members to carry the zero type thereon into printing position and additionally for moving those printing members distances depending on the value of the operated keys, and two means for restoring the printing members to normal position one of which coacts only with the printing members corresponding to said second set of keys, substantially as set forth.

29. A calculating machine comprising the combination of a row of keys, a printing member, a connection from said keys to said member having provision for lost motion therein, a zero key, means actuated by the depression thereof for operating said member to the extent permitted by said lost motion, and means for restoring the printing member to the extent permitted by said lost motion, substantially as set forth.

30. A calculating machine comprising the combination of a row of keys, a printing member, a connection from said keys to said member having lost motion therein, a zero key, means actuated by the operation of the zero key for operating the member to the extent permitted by said lost motion, means actuated by the operation of any one of the keys of said row for operating said member to the extent permitted by said lost motion and additionally an amount depending on the value of the key depressed, and two means for restoring the printing member to normal position, substantially as set forth.

31. A calculating machine comprising the combination of a row of keys, a printing member, a connection from said keys to said member, a zero key, and means actuated by movement of said key for positioning the printing member independently of said convention, substantially as set forth.

32. A calculating machine comprising the combination of a row of keys, a printing member, a connection from said keys to said member for positioning the member by the movement of a key, a zero key, means actuated by movement of the zero key for positioning the printing member independently of said connection, and means actuated by movement of a key of said row for operating the said means actuated by the zero key, substantially as set forth.

33. A calculating machine comprising the combination of a row of keys, a printing member, a connection from said keys to said member, a zero key, means actuated by movement of said key for positioning the printing member independently of said connection, and two restoring devices for said printing member, substantially as set forth.

34. A calculating machine comprising the combination of a row of keys, a printing member, a connection from said keys to said member for positioning the member by the movement of a key, a zero key, means actuated by movement of the zero key for positioning the printing member independently of said connection, means actuated by movement of a key of said row for operating the said means actuated by the zero key, and two restoring devices for said printing member, substantially as set forth.

35. A calculating machine comprising the combination of a plurality of rows of keys, a slide-bar for each row movable under the control of the keys thereof, member-wheels, wheel-actuating devices positioned by the movement of the slide-bars, means for operating the wheels and returning the slide-bars to normal position, printing members positioned by the movement of the slide-bars, and means for operating the printing members independently of the slide-bars, substantially as set forth.

36. A calculating machine comprising the combination of a plurality of rows of keys, a slide-bar for each row movable under the control of the keys thereof, member-wheels, wheel-actuating devices positioned by the movement of the slide-bars, means for operating the wheels and returning the slide-bars to normal position, printing members positioned by the movement of the slide-bars, means for positioning the printing members for printing independently of the slide-bars, and means for restoring the printing members independently of the slide-bars, substantially as set forth.

37. A calculating machine comprising the combination of a plurality of rows of keys, a slide-bar for each row movable under the control of the keys thereof, member-wheels, wheel-actuating devices positioned by the movement of the slide-bars, means for operating the wheels and returning the slide-bars to normal position, printing members positioned by the movement of the slide-bars, zero keys, and means actuated by movement thereof for positioning the corresponding printing members without actuating the slide-bars, substantially as set forth.

38. A calculating machine comprising the combination of a plurality of rows of keys, a slide-bar for each row movable under the control of the keys thereof, member-wheels, wheel-actuating devices positioned by the movement of the slide-bars, means for operating the wheels and returning the slide-bars to normal position, printing members positioned by the movement of the slide-bars, zero keys, means actuated by movement thereof for positioning the corresponding printing members without actuating the slide-bars, and means operated by movement of a slide-bar for operating the said means actuated by the zero keys, substantially as set forth.

39. A calculating machine comprising the combination of a row of keys, a slide-bar movable under the control of the keys, a printing member connected to the slide-bar, a zero key, and means for positioning the printing member operated either by the zero key or by the slide-bar, substantially as set forth.

40. A calculating machine comprising the combination of a row of keys, a slide-bar movable under the control of the keys, a printing member, a connection between the slide-bar and said member having lost motion therein, a spring for actuating said member to the extent permitted by the lost motion, a latch for holding the member against the tension of said spring, and means for operating the latch, substantially as set forth.

41. A calculating machine comprising the combination of a row of keys, a slide-bar movable under the control of the keys, a printing member, a connection between the slide-bar and said member having lost motion therein, a spring for actuating said member to the extent permitted by the lost motion, a latch for holding the member against the tension of said spring, a zero key, and means for actuating the latch by said key and by said slide-bar, substantially as set forth.

42. A calculating machine comprising the combination of a row of keys, a slide-bar movable under the control of the keys, a printing member, a connection between the slide-bar and said member having lost motion, a spring for actuating said member to the extent permitted by the lost motion, a latch for holding the member against the tension of said spring, means for operating the latch, and means for restoring the printing member and thereby resetting the latch, substantially as set forth.

This specification signed and witnessed this 18th day of March, 1911.

ERNEST J. BRASSEUR.

Witnesses:

William G. Arnold,

M. H. Burhart.